United States Patent
Vargas

(10) Patent No.: US 10,273,437 B2
(45) Date of Patent: Apr. 30, 2019

(54) LOW FLAMMABILITY SOLVENT COMPOSITION

(71) Applicant: Illinois Tool Works Inc., Glenview, IL (US)

(72) Inventor: Olga Liliana Vargas, Alpharetta, GA (US)

(73) Assignee: Illinois Tool Works Inc., Glenview, IL (US)

( * ) Notice: Subject to any disclaimer, the term of this patent is extended or adjusted under 35 U.S.C. 154(b) by 38 days.

(21) Appl. No.: 15/271,718

(22) Filed: Sep. 21, 2016

(65) Prior Publication Data

US 2017/0101609 A1    Apr. 13, 2017

Related U.S. Application Data

(60) Provisional application No. 62/238,896, filed on Oct. 8, 2015.

(51) Int. Cl.
| | | |
|---|---|---|
| C11D 7/50 | (2006.01) |
| C11D 3/24 | (2006.01) |
| C11D 17/00 | (2006.01) |
| C09K 3/30 | (2006.01) |
| C23G 5/028 | (2006.01) |
| B08B 3/02 | (2006.01) |
| B08B 3/10 | (2006.01) |
| B65D 83/30 | (2006.01) |

(52) U.S. Cl.
CPC .......... *C11D 17/0043* (2013.01); *B08B 3/02* (2013.01); *B08B 3/10* (2013.01); *B65D 83/30* (2013.01); *C09K 3/30* (2013.01); *C11D 3/24* (2013.01); *C11D 3/245* (2013.01); *C11D 7/5018* (2013.01); *C23G 5/02806* (2013.01)

(58) Field of Classification Search
CPC . C11D 7/5018; C11D 11/0047; C11D 7/5063; C11D 7/5059
USPC ........ 510/177, 461, 506, 411, 412, 409, 410
See application file for complete search history.

(56) References Cited

U.S. PATENT DOCUMENTS

| | | |
|---|---|---|
| 4,999,127 A | 3/1991 | Merchant |
| 5,250,208 A | 10/1993 | Merchant et al. |
| 5,290,473 A | 3/1994 | Basu et al. |
| 5,298,083 A | 3/1994 | Van Der Puy et al. |
| 5,304,322 A | 4/1994 | Kuse |
| 5,352,375 A | 10/1994 | Swan et al. |
| 5,424,002 A | 6/1995 | Omure et al. |
| 5,458,692 A | 10/1995 | Matsuhisa et al. |
| 5,484,489 A | 1/1996 | Flynn et al. |
| 5,531,916 A | 7/1996 | Merchant |
| 5,552,080 A | 9/1996 | Bolmer |
| 5,605,882 A | 2/1997 | Klug et al. |
| 5,648,016 A | 7/1997 | Klug et al. |
| 5,654,129 A | 8/1997 | Taylor |
| 5,750,488 A | 5/1998 | Haskell et al. |
| 5,779,931 A | 7/1998 | Klug et al. |
| 5,827,446 A | 10/1998 | Merchant et al. |
| 5,851,436 A | 12/1998 | Merchant et al. |
| 5,851,977 A | 12/1998 | Gorton et al. |
| 5,902,412 A | 5/1999 | Taylor |
| 5,962,390 A | 10/1999 | Flynn et al. |
| 5,965,511 A | 10/1999 | Michaud et al. |
| 6,053,952 A | 4/2000 | Kaiser |
| 6,100,229 A | 8/2000 | Swan et al. |
| 6,159,917 A | 12/2000 | Baran, Jr. et al. |
| 6,197,426 B1 | 3/2001 | Coppens |
| 6,235,700 B1 | 5/2001 | Flynn et al. |
| 6,255,273 B1 | 7/2001 | Musso et al. |
| 6,274,543 B1 | 8/2001 | Milbrath et al. |
| 6,281,184 B1 | 8/2001 | Michaud et al. |
| 6,288,017 B1 | 9/2001 | Flynn et al. |
| 6,291,417 B1 | 9/2001 | Flynn et al. |
| 6,699,829 B2 | 3/2004 | Doyel et al. |
| 6,770,614 B2 | 8/2004 | Miller et al. |
| 6,951,835 B1 | 10/2005 | Minor et al. |
| 7,053,036 B2 | 5/2006 | DeGroot et al. |
| 7,288,511 B2 | 10/2007 | Doyel et al. |
| 7,524,806 B2 | 4/2009 | Wu |
| 7,943,564 B1 | 5/2011 | Karniotis Thomas et al. |
| 8,053,403 B2 | 11/2011 | Abbas |
| 2001/0018408 A1 | 8/2001 | Flynn et al. |
| 2001/0044404 A1 | 11/2001 | Flynn et al. |
| 2007/0010421 A1 | 1/2007 | Wu |
| 2007/0203046 A1 | 8/2007 | Minor et al. |

FOREIGN PATENT DOCUMENTS

| | | |
|---|---|---|
| WO | WO 03/078539 A1 | 9/2003 |
| WO | WO 2008/073408 A1 | 6/2008 |
| WO | WO 2010/085397 A1 | 7/2010 |
| WO | WO 2014/096417 A1 | 6/2014 |

OTHER PUBLICATIONS

International Search Report dated Jan. 2, 2017 for International Application No. PCT/US2016/055998 filed Oct. 7, 2016.

*Primary Examiner* — Gregory E Webb
(74) *Attorney, Agent, or Firm* — Avery N. Goldstein; Blue Filament Law PLLC

(57) ABSTRACT

A solvent composition is provided that includes a chlorinated ethylene present from 75 to 80 total weight percent and at least one halocarbon miscible with the chlorinated ethylene and present in an amount to define a weight ratio of the chlorinated ethylene to said at least one halocarbon of from 75:25-80:20. The solvent composition has a flash point of less than 23 degrees Celsius and an initial boiling point of greater than 35 degrees Celsius. When the solvent is packaged as an aerosol with a propellant, the resulting solvent can be used in confined spaces owing to reduced ignitibility and better human health and environmental properties compared to conventional aerosol degreasers.

22 Claims, No Drawings

LOW FLAMMABILITY SOLVENT COMPOSITION

RELATED APPLICATIONS

This application is a non-provisional application that claims priority benefit of U.S. Provisional Application Ser. No. 62/238,896 filed 8 Oct. 2015; the contents of which are hereby incorporated by reference.

FIELD OF THE INVENTION

The present invention relates in general to the technical field of degreasing and in particular to solvent-based degreasing compositions that have a lower flammability rating and better human health and environmental properties than conventional solvent-based degreasing compositions.

BACKGROUND OF THE INVENTION

Halocarbon based fluids have found widespread use in industry for solvent cleaning and solvents in aerosols for the degreasing and otherwise cleaning of solid surfaces, especially intricate parts and difficult to remove soils. Unfortunately, many of the properties that render these solvent mixtures attractive for degreasing also makes them highly flammable with flammability ratings according to the Globally Harmonized System (GHS) of labelling of Category 1 or 2. This category is defined by a flash point of greater or equal to 23° C. and less than or equal to 60° C., where the flash Point is determined by closed cup methods as provided in the GHS document, Chapter 2.5, paragraph 11. As a result of the flammability hazard, usage of such solvents is limited to a subset of the environments in which could be useful.

In its simplest form, vapor degreasing or solvent cleaning involves exposing a room temperature article to be cleaned to an aerosol spray or vapors of a boiling solvent. Vapors condensing on the article provide clean distilled solvent to wash away organic soils, such as grease or other contamination from the article. Final evaporation of solvent from the object carries much of the organic soil therewith and limits the amount of residue associated with simply washing the article in liquid solvent.

As it is difficult to find a single, pure solvent molecule that achieves all the desired goals of a degreasing solvent, blends are typically employed. With the use of degreasing solvents at to near boiling points for solvent mixture constituents, azeotropes have been extensively explored as the molecular level interactions associated with azeotropes precludes fractionation upon boiling. Often conventional degreasing solvents have tolerated higher levels of flammability in order to obtain the desired levels of stability and degreasing ability with lower cost constituents. However, there is a growing appreciation that reducing the flammability category of degreasing solvents produces health and safety benefits that cannot be treated as secondary considerations.

Additionally, reformulation of conventional degreasing solvents is of concern owing to the tropospheric ozone depleting properties of chlorofluorocarbons. The resulting limitations of the usage of such compounds favors usage of fluorocarbons. In this effort, 1,1,1,3,3-pentafluoropropane and chlorinated ethylenes (trans 1,2 dichloroethylene, methylene chloride, trichlorethylene, and mixtures thereof), have been investigated, yet the flammability and/or ignitability in confined spaces of such solvent mixtures remains problematic.

Thus, there exists a need for a degreasing composition that retains the solvency and environmentally tolerated properties of conventional degreasing compositions while reducing the GHS flammability category rating from category 1 or 2 to a category of non-flammable or not classified.

SUMMARY OF THE INVENTION

A solvent composition is provided that includes a chlorinated ethylene present from 75 to 80 total weight percent and at least one fluorocarbon miscible with the chlorinated ethylene and present in an amount to define a weight ratio of the chlorinated ethylene to said at least one fluorocarbon of from 75:25-80:20 The solvent composition has a flash point of less than 23 degrees Celsius and an initial boiling point of greater than 35 degrees Celsius. When the solvent is packaged as an aerosol with a non-hydrocarbon propellant, and/or an identified hydrofluorocarbon, the resulting solvent is a non-flammable, or not classified aerosol compared to conventional aerosol degreasers.

DETAILED DESCRIPTION OF THE PREFERRED EMBODIMENTS

The present invention has utility as a solvent for use in aerosol, refrigeration flushing, oxygen system cleaning, and degreasing applications including electronics cleaning.

The present invention finds particular utility as solvent based heavy duty degreaser that has a non-flammability (not classified) category per GHS Revision 3 (adopted by OSHA in 2012), and better human health and environmental properties compared to conventional degreaser solvents.

Without intending to be bound by a particular theory, the present invention is believed to be an azeotropic blend in which dichloroethylene affords degreasing power and a halocarbon component reduces the blend flammability. In some embodiments of the present invention including a propellant in an aerosol packaging, a non-hydrocarbon compressed gas propellant and/or an identified hydrofluorocarbon, is provided to reduce the flammability/ignitability properties of the inventive solvent. As a result an inventive aerosol container containing solvent is operative as a heavy duty degreaser which does not represent a physical hazard in the workplace, and in transportation; in contrast to conventional aerosol heavy duty degreasers.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

The present invention relates to solvent composition including 75 to 80 total weight percent of a chlorinated ethylene. In certain embodiments, the chlorinated ethylene has 1,2-trans-dichloroethylene as the majority by weight of the chlorinated ethylene. In still other embodiments, the 1,2-trans-dichloroethylene is present as the only chlorinated ethylene. At least one halocarbon miscible with the chlorinated ethylene is present in an amount to define a weight ratio of the chlorinated ethylene to said at least one halocarbon of from 75:25-80:20. In some specific embodiments, the ratio is 77:23-80:20. The solvent composition has a flash point of less than 23 degrees Celsius and an initial boiling point of greater than 35 degrees Celsius. For the purposes of measure flash point, pressure is normalized to standard pressure of 760 torr per ASTM D3278-96 (2011).

As used herein, a "chlorinated ethylene" is defined as a dichloroethylene, a trichloroethylene, methylene chloride, and combinations thereof. It is appreciated that a dichloroethylene exists as 1,2-cis, 1,2-trans, and 1,1-gem isomers.

The at least one halocarbon is selected to limit the flammability and ignition characteristics of the chlorinated solvent. In some invention embodiments, the at least one halocarbon is a mixture of several fluorocarbons. In still other embodiments of the present invention all of the at least one halocarbon are perfluorocarbons. A perfluorocarbon is a molecule in which only carbon-carbon bonds and carbon-fluorine bonds are present and in contrast to a hydrocarbon, all the carbon-hydrogen bonds have been replaced with carbon-fluorine bonds. Halocarbons operative in the present invention are $C_3$-$C_7$ molecules that are either linear, branched, or cyclic; aliphatically saturated; and contain at least half of all carbon-hydrogen bonds in the corresponding hydrocarbon replaced with carbon-fluorine bonds. Halocarbons operative in the present invention illustratively include 1,3,3,3-tetrafluoropropene, 1-chloro-3-3-3-trifluoropropene, decafluoropentane, methoxytridecafluoroheptene, trans-5-methoxy-perfluoro-3-pentene, trans-1-chloro-3,3,3-trifluoropropene, perfluorocyclohexane, methoxytridecafluoroheptene, isomers of any of the aforementioned, and any of a group of organic compounds that contain carbon, fluorine, and optionally oxygen and/or hydrogen, used as refrigerants, in aerosols, and in other products in place of chlorofluorocarbons.

Without intended to be bound to a particular theory of operation, the quantity of chlorinated ethylene provides a high level of degreasing to an invention solvent composition, while the halocarbon component is selected to reduce flammability properties relative to conventional degreasing solvents. Owing the properties of an inventive solvent composition detailed in the following Examples, it is surmised that the inventive solvent composition encompasses azeotropes or azeotrope-like compositions based on the consistency of boiling point temperatures. Practically, an inventive solvent composition exhibits the property of limited components separation during boiling, and therefore are useful in solvent and aerosol solvent applications.

An inventive solvent composition is readily packaged in an aerosol container with a propellant. In order to achieve the reduction in flammability associated with present invention relative to the prior art, the propellant is selected to be a majority by propellant weight of a non-hydrocarbon propellant. In still other embodiments of the present invention, the propellant is devoid of hydrocarbons and halocarbons, Preferred propellants according to the present invention include carbon dioxide, nitrogen, trans-1,3,3,3-tetrafluoropropene (HFO 1234ze), or a combination thereof. Typical loading of a propellant are from 1 to 5 percent if carbon dioxide or nitrogen are present, and from 20-40 percent if trans 1,3,3,3-tetrafluoropropene (HFO 1234ze) is present by weight of the chlorinated ethylene and the at least one halocarbon. While propellants are operative in the present invention, as noted above, when are present, the propellant is present as a minority constituent compared to the weight of the chlorinated ethylene and the at least one halocarbon. Exemplary of such propellants, are 1,1,1,2-tetrafluoroethane, dimethyl ether, and isobutene.

An aerosol package containing an inventive solvent composition includes an aerosol container having a volume and an aperture. The container is formed from a material that is compatible with the inventive solvent composition and includes a container wall or at least liner contacting the volume in which the solvent resides that is illustratively formed from metals such as tin plated steel, aluminum; glass; or polymer coated steel. A spray nozzle is provided to selectively seal the aperture. In inventive embodiments inclusive of a propellant, a one piece valve is preassembled with the valve cup, dip tube, and actuator, can as unitary assembly, and prior to pressure-filling.

In a particular inventive embodiment, the propellant is carbon dioxide present in an amount of from 1 to 5 weight percent of the solvent composition. Without intending to be bound to a particular theory of operation, it is believed that carbon dioxide in the spray environment by locally and transiently displacing some atmospheric oxygen reduces the likelihood of spontaneous ignition, especially in confined spaces thereby making the inventive composition suitable for usage in such settings.

In operation as a degreaser, an inventive solvent composition is applied as a spray onto an article. The spray being formed with resort to a pump spray or a propellant induced aerosol. After allowing sufficient time for the spray to penetrate organic soil on the article, the organic soil is displaced from the article. In some embodiments, mechanical force is applied to the article while after solvent composition to remove organic soil loosened by the inventive solvent composition. A wipe, rag, or other type cloth is well-suited for removal of a heavy organic soil layer from a target article. In still other embodiments, an article is dipped or placed in a solvent spray chamber. It is appreciated that the controlled environment of a chamber is amenable to usage of a solvent recycle system.

It is appreciated that an inventive solvent composition in some embodiments includes additional components with the proviso that the GHS category Revision 3 of nonflammable (not classified) of present invention is retained. Such additional components illustratively include corrosion inhibitors such as $C_4$-$C_8$ alkanols, $C_1$-$C_3$ nitroalkanes, $C_2$-$C_{12}$ 1,2-epoxyalkanes, $C_{12}$-$C_{30}$ phosphite esters, $C_2$-$C_8$ ethers, $C_4$-$C_8$ alkenes, $C_4$-$C_8$ acetals, $C_3$-$C_8$ ketones, $C_4$-$C_{12}$ amines, and combinations thereof. Typical loadings of an inhibitor, if present is 0.1 to 2 weight percent of the solvent composition, with the solvent composition amount being exclusive of propellant.

The present invention is more fully illustrated by the following non-limiting Examples.

EXAMPLES

Examples 1-3 and Comparative Examples

The GHS flammability of several novel solvent compositions are tested relative to commercially available, prior art aerosol blends. The various compositions were tested by performing the UN 31.5 enclosed space ignition test to fulfill the GHS flammability criteria for physical hazard. The test results for Comparative Commercial Compositions A-C and Inventive Blends 1-3 are provided in Table 1.

Comparative Commercial Composition A

| Component chemical name | Component common name | CAS number | Component amount as total weight percent |
|---|---|---|---|
| 1,1,2-Tetrafluoroethane | HFC-134a | 811-97-2 | 40-50 |
| | Blend of trans-1,2-dichloroethylene, methylal, and | Proprietary | 40-50 |

-continued

| Component chemical name | Component common name | CAS number | Component amount as total weight percent |
|---|---|---|---|
| Decafluoropentane | fluorinated compound HFC 43-10mee | 138495-42-8 | 5-10 |
| Carbon dioxide | | 124-38-9 | 1-3 |

Comparative Commercial Composition B

| Component chemical name | Component common name | CAS number | Component amount as total weight percent |
|---|---|---|---|
| | Blend of trans-1,2-dichloroethylene, methylal, and fluorinated compound | Proprietary | 80-90 |
| Decafluoropentane | HFC 43-10mee | 138495-42-8 | 10-20 |
| Carbon dioxide | | 124-38-9 | 3-5 |
| | Blend of trans-1,2-dichloroethylene, methylal, and fluorinated compound | Proprietary | 1-3 |

Comparative Commercial Composition C

| Component chemical name | Component common name | CAS number | Component amount as total weight percent |
|---|---|---|---|
| 1,1,1,2,2,3,4,5,5,5-decafluoropentane | HFC-4310mee | 138495-42-8 | 10-20 |
| 1,2-trans-dichloroethylene | | 156-60-5 | 50-70 |
| Ethanol | | 64-17-5 | 1-5 |
| 1,1,1,2-Tetrafluoroethane | HFC-134a | 811-97-2 | 15-25 |
| Carbon dioxide | | 124-38-9 | 3-5 |

Inventive Composition Blend 1

| Component chemical name | Component common name | CAS number | Component amount as total weight percent |
|---|---|---|---|
| 1,2-trans-dichloroethylene | | 156-60-5 | 50-80 |
| Decafluoropentane | HFC 43-10mee | 138495-42-8 | 20-50 |
| Carbon dioxide* | | 124-38-9 | 1-5 |

*Such that wt/wt ratio of 1,2-trans dichloroethylene:2,3-Decafluoropentane < 4:1

Inventive Composition Blend 2

| Component chemical name | Component common name | CAS number | Component amount as total weight percent |
|---|---|---|---|
| 1,2-trans-dichloroethylene | | 156-60-5 | 28-63 |
| Decafluoropentane | HFC 43-10mee | 138495-42-8 | 11-40 |
| 1,3,3,3-trans-tetrafluoropropene | HFO-1234ze | 29118-24-9 | 20-40 |
| Carbon dioxide* | | 124-38-9 | 1-5 |

*Such that wt/wt ratio of 1,2-trans dichloroethylene:Decafluoropentane < 5.5:1

Inventive Composition Blend 3

| Component chemical name | Component common name | CAS number | Component amount as total weight percent |
|---|---|---|---|
| 1,2-trans-dichloroethylene | | 156-60-5 | 81-99 |
| Decafluoropentane | HFC 43-10mee | 138495-42-8 | 0-15 |
| Carbon dioxide* | | 124-38-9 | 1-5 |

*Such that wt/wt ratio of 1,2-trans dichloroethylene: Decafluoropentane > 5.5:1

Inventive Composition Blend 4

| Component chemical name | Component common name | CAS number | Component amount as total weight percent |
|---|---|---|---|
| 1,2-trans-dichloroethylene | | 156-60-5 | 40-60 |
| Trans 5-methoxy-perfluoro-3-pentene and eight isomeric structures thereof | | proprietary | 40-60 |
| Carbon dioxide* | | 124-38-9 | 1-5 |

*Such that wt/wt ratio of 1,2-trans dichloroethylene:Trans 5-methoxy-perfluoro-3-pentene and eight isomeric structures thereof ≤ 1.5:1

Inventive Composition Blend 5

| Component chemical name | Component common name | CAS number | Component amount as total weight percent |
|---|---|---|---|
| 1,2-trans-dichloroethylene | | 156-60-5 | 30-50 |
| Trans, 1-Chloro-3-3-3 trifluoro propene | Solstice PF | 102687-65-0 | 40-60 |
| Carbon dioxide* | | 124-38-9 | 1-5 |

*Such that wt/wt ratio of Trans, 1-Chloro-3-3-3 trifluoro propene:1,2-trans dichloroethylene: ≤ 1.5:1

TABLE 1

GHS Flammability Category for comparative compositions A-C and inventive composition blends 1-3 based on classification criteria for substances and mixtures physical hazards (according to the Fifth Revised edition of the GHS, published in 2013).

| Composition | GHS Rev 3 Flammability Category Physical Hazard |
|---|---|
| Comparative Composition A | Gas Under Pressure ·Compressed Gas |
| Comparative Composition B | Flammable Aerosol Category 2 |
| Comparative Composition C | Gas Under Pressure ·Compressed Gas |
| Inventive Composition Blend 1 | Gas Under Pressure ·Compressed Gas |
| Inventive Composition Blend 2 | Gas Under Pressure ·Compressed Gas |
| Inventive Composition Blend 3 | Gas Under Pressure ·Compressed Gas |
| Inventive Composition Blend 4 | Gas Under Pressure ·Compressed Gas |
| Inventive Composition Blend 5 | Gas Under Pressure ·Compressed Gas |

According to GHS Revision 4, the inventive Blends 1-5 and Comparative Compositions A-C (denoted synonymously as Prior Art A-C, respectively) would have the following categorization as provided in Table 2.

TABLE 2

GHS Revision 4 Flammability Classification/Category for inventive and comparative blends

| GHS Flammability Classification/Category | | Blends |
|---|---|---|
| Category | 3 | 1 |
| Category | 3 | 2 |
| Category | 2 | 3 |
| Category | 3 | 4 |
| Category | 3 | 5 |
| Category | 3** | Prior Art A |
| Category | 2 | Prior Art B |
| Flash Point/Not GHS | $3^2$ | Prior Art C |

*(Category 1: extremely flammable aerosol, Category 2: flammable aerosol, and Category 3: non-flammable aerosol)
**Includes two different propellants, different ratios, and other proprietary compositions. Category 2 included only to show this blend is flammable, GHS version not yet available

Example 4

The composition of INVENTIVE COMPOSITION BLEND 2 is modified with the replacement of 1,2-trans-dischloroethylene with 1,1-dichloroethylene with similar nonflammable properties.

Example 5

The composition of INVENTIVE COMPOSITION BLEND 1 is modified with the replacement of decafluoropentane with methoxytridecafluoroheptene with similar non-flammable properties.

Example 6

The composition of INVENTIVE COMPOSITION BLEND 3 is modified with the replacement of decafluoropentane with methoxytridecafluoroheptene with similar non-flammable properties.

The foregoing description is illustrative of particular embodiments of the invention, but is not meant to be a limitation upon the practice thereof. The following claims, including all equivalents thereof, are intended to define the scope of the invention.

The invention claimed is:

1. A solvent composition comprising:
   a chlorinated ethylene present from 75 to 80 total weight percent;
   at least one halocarbon miscible with said chlorinated ethylene and present in an amount to define a weight ratio of said chlorinated ethylene to said at least one halocarbon of from 75:25-80:20, the solvent composition having an initial boiling point of greater than 35 degrees Celsius; and
   wherein said at least one halocarbon is a $C_3$-$C_7$ molecule that is selected from the group consisting of: 1,3,3,3-tetrafluoropropene, methoxytridecafluoroheptene, trans-1-chloro-3,3,3-trifluoropropene, perfluorocyclohexane, methoxytridecafluoroheptene, and isomers of any of the aforementioned.

2. The solvent composition of claim 1 wherein said chlorinated ethylene is a majority by weight 1,2-trans-dichloroethylene.

3. The solvent composition of claim 1 wherein said chlorinated ethylene present from 77 to 80 total weight percent.

4. The solvent composition of claim 1 wherein said at least one halocarbon is a perfluorocarbon.

5. The solvent composition of claim 1 wherein said at least one halocarbon comprises 1,3,3,3-tetrafluoropropene.

6. A solvent composition comprising:
   a chlorinated ethylene present from 75 to 80 total weight percent;
   at least one halocarbon miscible with said chlorinated ethylene and present in an amount to define a weight ratio of said chlorinated ethylene to said at least one halocarbon fluorocarbon of from 75:25-80:20, the solvent composition having an initial boiling point of greater than 35 degrees Celsius;
   wherein said at least one halocarbon comprises decafluoropentane.

7. A solvent composition comprising:
   a chlorinated ethylene present from 75 to 80 total weight percent;
   at least one halocarbon miscible with said chlorinated ethylene and present in an amount to define a weight ratio of said chlorinated ethylene to said at least one halocarbon fluorocarbon of from 75:25-80:20, the solvent composition an initial boiling point of greater than 35 degrees Celsius;
   wherein said at least one halocarbon comprises 5-methoxy-perfluoro-3-pentene.

8. A solvent composition comprising:
   a chlorinated ethylene present from 75 to 80 total weight percent;
   at least one halocarbon miscible with said chlorinated ethylene and present in an amount to define a weight ratio of said chlorinated ethylene to said at least one halocarbon fluorocarbon of from 75:25-80:20, the solvent composition having an initial boiling point of greater than 35 degrees Celsius;
   wherein said at least one halocarbon comprises 1-chloro-3,3,3 trifluoro propene.

9. The solvent composition of claim 1 further comprising a propellant.

10. The solvent composition of claim 9 wherein said propellant is carbon dioxide, nitrogen, trans-1,3,3,3-tetrafluoropropene, or a combination thereof.

11. The solvent composition of claim 9 wherein said propellant is present from 1 to 5 percent if the carbon dioxide or the nitrogen, and from 20-40 percent if the trans-1,3,3,3-tetrafluoropropene.

12. An aerosol package having a solvent content with a flash point of less than 23 degrees Celsius and an initial boiling point of greater than 35 degrees Celsius comprising:
    an aerosol container having a volume and an aperture;
    the solvent composition of claim 1 and a propellant within the volume; and
    a spray nozzle selectively sealing the aperture.

13. The aerosol package of claim 12 wherein said propellant is carbon dioxide within the volume.

14. The solvent composition of claim 6 further comprising a propellant.

15. The solvent composition of claim 14 wherein said propellant is present from 1 to 5 percent if the carbon dioxide or the nitrogen, and from 20-40 percent if the trans-1,3,3,3-tetrafluoropropene.

16. The solvent composition of claim 7 further comprising a propellant.

17. The solvent composition of claim 16 wherein said propellant is carbon dioxide, nitrogen, trans-1,3,3,3-tetrafluoropropene, or a combination thereof.

18. The solvent composition of claim 17 wherein said propellant is present from 1 to 5 percent if the carbon dioxide or the nitrogen, and from 20-40 percent if the trans-1,3,3,3-tetrafluoropropene.

19. The solvent composition of claim 8 wherein said chlorinated ethylene is a majority by weight 1,2-trans-dichloroethylene.

20. The solvent composition of claim 8 further comprising a propellant.

21. The solvent composition of claim 17 wherein said propellant is carbon dioxide, nitrogen, trans-1,3,3,3-tetrafluoropropene, or a combination thereof.

22. The solvent composition of claim 17 wherein said propellant is present from 1 to 5 percent if the carbon dioxide or the nitrogen, and from 20-40 percent if the trans-1,3,3,3-tetrafluoropropene.

\* \* \* \* \*